(12) United States Patent
Schweiger

(10) Patent No.: US 7,274,839 B2
(45) Date of Patent: Sep. 25, 2007

(54) MEASURING DEVICE

(75) Inventor: Gustav Schweiger, Eichendorffstrasse 15, 47057 Duisburg (DE)

(73) Assignee: Gustav Schweiger, Duisburg (DE)

( * ) Notice: Subject to any disclaimer, the term of this patent is extended or adjusted under 35 U.S.C. 154(b) by 41 days.

(21) Appl. No.: 10/534,850

(22) PCT Filed: Nov. 18, 2003

(86) PCT No.: PCT/EP03/12896

§ 371 (c)(1),
(2), (4) Date: May 13, 2005

(87) PCT Pub. No.: WO2004/046674

PCT Pub. Date: Jun. 3, 2004

(65) Prior Publication Data

US 2006/0013531 A1    Jan. 19, 2006

(30) Foreign Application Priority Data

Nov. 18, 2002    (DE)    ............................... 102 53 821

(51) Int. Cl.
*G02B 6/26*    (2006.01)
*G02B 6/42*    (2006.01)
*G02B 6/00*    (2006.01)
(52) U.S. Cl. ........................................ 385/15; 385/12
(58) Field of Classification Search .................... None
See application file for complete search history.

(56) References Cited

U.S. PATENT DOCUMENTS 6,781,696 B1 *    8/2004    Rosenberger et al. ....... 356/437
2003/0012504 A1 *   1/2003    Iltchenko ..................... 385/39
2005/0220411 A1 *  10/2005    Ilchenko ...................... 385/39

FOREIGN PATENT DOCUMENTS

| CH | 679427 A5 | 3/1989 |
| DE | 33 11 809 A1 | 3/1983 |
| DE | 3341048 A1 | 11/1983 |
| DE | 199 60 370 A1 | 12/1999 |
| EP | 0 402 962 A2 | 8/1985 |
| EP | 0 214 040 B1 | 8/1986 |

(Continued)

OTHER PUBLICATIONS

Pigtailing the High-Q Microsphere Cavity: A Simple Fiber Coupler for Optical Whispering-Gallery Modes, V. Itchenko et al, 1999 Optical Society of Americs Jun. 1, 1999, vol. 24. No. 11.

*Primary Examiner*—Michelle Connelly-Cushwa
*Assistant Examiner*—Chris Chu

(57) ABSTRACT

In a device for measuring physical parameters, such as temperature, light from a light source is coupled through one or more optical wavelengths into and out of a microparticle forming an "optical resonator". To optically and mechanically couple the resonator to the optical waveguide in the most favorable manner, the resonator is disposed within a recess in the optical waveguide, is retained there in a mechanical manner, and is optically coupled to the optical waveguide. The optical waveguide can be configured as a hollow guide. Alternatively, a cuneiform measuring tip is provided, comprising two converging webs, between which the resonator is arranged. The webs are made of light-conducting material while being coupled to at least one light-conducting fiber connected to the light source.

5 Claims, 7 Drawing Sheets

FOREIGN PATENT DOCUMENTS

| | | |
|---|---|---|
| EP | 0 251 496 A2 | 6/1987 |
| EP | 0251496 A2 * | 6/1987 |
| EP | 0 716 291 A2 | 12/1995 |
| EP | 1 265 059 A2 | 6/2002 |
| GB | 2 191.286 A | 6/1987 |
| WO | WO 02/44672 A2 | 6/2002 |

* cited by examiner

MEASURING DEVICE

BACKGROUND OF THE INVENTION

The invention refers to an apparatus to measure physical and/or chemical properties, especially for temperature measurements.

From DE 199 60 370 an apparatus for temperature measurement is known that utilizes an optical resonator. The optical resonator is shaped as microparticle. Light of a broadband light source (a laser diode) is coupled into the microparticle via thin light guiding tapered fibers, and decoupled from the microparticle and transferred to an optical spectrometer for evaluation. Within the spherical microparticle, light experiences multiple reflections due to total reflection on the surface. The wave trains interfere and—at certain wavelength of the light—resonances appear (the amplitude of the electromagnetic field in the microparticle is greatly enhanced). The resonance properties of the optical resonator depend on temperature due to thermal expansion and the change in index of refraction. The decoupled light is monitored by an optical spectrometer and the resonance spectrum is converted into a temperature value.

The method for temperature measurement described in DE 199 60 370 has a great number of advantages. Due to the small size of the resonator, it is suitable for temperature measurements with high spatial resolution. Because the measuring method is purely optical, the sensor can be used in environments with explosion risk as well as in environments with strong electromagnetic fields (e.g. nuclear spin tomography, microwave oven etc.).

In the case of the sensor described in DE 199 60 370 the coupling and decoupling of light is achieved by flexible optical fibers, with the fibers shaped into tips tapering down to just a few microns. These tips are connected to the microparticle by a photopolymeric adhesive.

In practical use, this sensor embodiment has some problems. Requirements on the photopolymeric adhesive are substantial. Due to the necessary exact positioning and mechanical fixing, the manufacturing of the sensor is complex.

SUMMARY OF THE INVENTION

It is therefore the object of the invention to improve upon measuring apparatus of the type described above and to propose a sensor that is capable for a variety of practical meteorological applications and can be manufactured at moderate cost.

This object is achieved by measuring apparatus wherein, in a first arrangement, the resonator is located in a cutout of the light guide, preferentially within a hollow waveguide and by apparatus wherein, in a second arrangement, the resonator is placed in a wedge-shaped sensing tip formed by two converging bars.

In apparatus according to the first arrangement, a cutout is formed in the light guide and the resonator is—at least partially—placed within this cutout. The resonator is mechanically fixed in this cutout and optically coupled to the light guide. The resonator is directly attached to the light guiding material and is fixed in this position by the jamming and/or the adhesive forces that act between the resonator and the light guide. Preferably, the resonator is more than half, and most preferably, the resonator is even totally housed in the cutout described above. Usually, light guides consist of a light guiding core and a cladding attached to it. Preferably, the cutout is formed in the core region. As described below in more detail, the light guide can also be realized as hollow waveguide. In this case, the central hollow part forms the cutout in which the resonator is placed.

This embodiment has the advantage that by the mechanical mounting of the resonator directly on the light guide no adhesive is necessary. In addition, it is no longer necessary to shape the light guides into thin tapered tips and to position said tips exactly on the resonator. In contrast, the resonator is directly fixed and positioned in the cutout of the light guide.

The resonator can have different shapes suitable for the generation of a resonance by total reflection on the boundary. Beside the preferably spherical shape, also cylindrical and ellipsoidal shapes can be considered, for example. It is advantageous if the shape of the opening of the light guide matches the shape of the resonator. For resonators with circular cross-section a conical or cylindrical cutout is recommended. Preferably, the cutout is arranged lengthwise in the light guide forming a free opening to the end of the light guide.

The mechanical fixing of the resonator on the light guide can be achieved by a variety of methods. Preferably, the resonator is in contact with the light guide at least at two distant positions, simultaneously, and the resonator is fixed at these positions by clamping. Especially preferred are ring-shaped contact zones that result from the contact of a spherical or ellipsoidal resonator with a cylindrical or conical cutout. Due to the contact on at least two positions in sufficient distance from each other, an advantageous nearly tangential optical coupling is achieved, on the one hand; and a tight mechanical fixing is achieved by the resulting clamping and adhesive forces at the contact positions, on the other hand.

According to an advanced embodiment of the invention, only one light guide is present. This light guide guides light from the light source to the resonator; however, the light guide guides also light decoupled from the resonator in the opposite propagation direction. That embodiment is a far simpler design than a sensor with separate optical guides to and from the resonator. With a directional coupler in the evaluation unit the coupling of light for excitation can be separated from the decoupling of light for evaluation purposes.

In one preferred embodiment, the light guide is a hollow waveguide. The resonator is located inside the hollow waveguide, and preferably the resonator diameter is adjusted to the diameter of the hollow waveguide. That results in a good optical and mechanical contact between the resonator body and the hollow waveguide. The inner diameter of the hollow waveguide can also vary so that a step or transition region is formed between a larger inner diameter close to the free end of the hollow waveguide and a smaller inner diameter farther distant from the free end. If the resonator is placed in the transition region or at the step, an especially good mechanical and optical contact results between the hollow waveguide and the resonator in addition to an exact positioning of the resonator. Furthermore, it is possible that the hollow waveguide enlarges to its free end. This makes it especially easy to achieve matching between the resonator and the hollow waveguide.

The light guide with the resonator mounted in the cutout can be shaped into different embodiments. For example, it is possible that the light guide tapers off on its free end. To achieve a higher mechanical flexibility of the light guide for clamping the resonator, the light guide can have one or several lengthwise slits in the area of its free end. Finally, the end of the light guide can be sealed by a cap or closed by sealing compound.

In the second arrangement according to the invention, a wedge-shaped sensing tip is used. The resonator is located on the front part of the sensing tip. On the rear part of the sensing tip, two light guides are mounted. The sensing tip has two facing converging bars. These bars consist at least in part of light guiding material. The resonator is arranged between the two bars.

In an advantageous embodiment the rear part of the sensing tip has a socket with openings to hold two light guides—preferably commercially available light guides—with a diameter ranging e.g. from 80 to 125 µm. The wedge-shape of the sensing tip permits the optical coupling of that two light guides to the resonator body, which has a diameter of usually less than 200 µm and typically a diameter in the range between 50 µm and 100 µm.

Preferably, the resonator is fixed mechanically between the bars. Here, the resonator can rest directly against the bars and thus is held mechanically by clamping or adhesive forces. In this case, the optical coupling is provided by the light guiding material of the bars. Provision can be possible, that small gaps between the resonator and the bars are maintained that can be used to adjust the degree of coupling. For example, the gap width is less than 1 µm. Preferably, the gap width is in the order of the wavelength of the light used. In that case, the resonator is attached to a ground and/or a cover plate where it is fixed by clamping and/or adhesive forces. Ground and/or sidebars can have one or several longwise slits to increase the flexibility. To improve the positioning, the ground and/or cover plate can also have a guide groove running longwise, which accepts the resonator.

For the measuring apparatus according to both the first and second arrangements, a number of advanced embodiments are possible. Thus, the apparatus can comprise several resonators. They can be attached to the same light guide or guides. For example, in the case of a hollow waveguide several resonators can be placed at different locations within the hollow waveguide by this way. Similarly, several resonators with different sizes can be placed in a row between the bars of the wedge shaped sensing tip. On the one hand, several resonators can serve for a simultaneous measurement on different locations. On the other hand, different resonators can also be used for measurements in different measuring ranges. In this way a higher accuracy in a particular measuring range or an extension of the measuring range is achieved.

In the case of coupling of several resonators to one or several light guides, signal evaluation demands the discrimination of signals from different resonators. This is necessary to determine the corresponding measured values. This can be realized by exploiting runtime information. However, it is preferable that different resonators show resonances at different optical wavelengths and can therefore be discriminated.

For the actual measuring process, a broadband light source can be used according to one preferred embodiment. This light source has a continuous spectrum. Preferably, the spectral width of the light source comprises at least one free spectral range and one mode distance of the resonator, respectively. The evaluation is then made frequency selective to determine the resonance position. According to another preferred embodiment, a light source, such as a tunable laser diode, is used that can be addressed to generate light at various frequencies. Using a tunable laser to excite the resonator/resonators, a simple measurement of the intensity of the light decoupled from the resonator is sufficient to determine the spectral position of a resonance. This is achieved by the determination of at least one local maximum in the intensity while exciting the particular resonator with its resonance frequency. From the spectral position of the resonance the measuring value of the physical and chemical quantity, respectively, on the location of the corresponding resonator can be determined.

According to another advanced embodiment of this invention, it is envisioned that the material of the resonator is excited to fluorescence. For this purpose, the material is doped by fluorophors. The excitation is broadband. The resonance frequency is determined. The use of fluorescence is also described in the aforementioned DE 199 60 370.

With the invention described herein each physical quantity, such as the temperature, can be measured that affects the resonance of the resonator, for example by changing the size, shape and/or index of refraction of the resonator. The measurement of pressure is also possible. In addition, it is possible to measure the concentration of substances that alter the optical properties of the resonator (e.g. by diffusion).

For a full understanding of the present invention, reference should now be made to the following detailed description of the preferred embodiments of the invention as illustrated in the accompanying drawings.

BRIEF DESCRIPTION OF THE DRAWINGS;

FIG. 13b is a view of the cross-section along the line B.B of FIG. 13a.

DESCRIPTION OF THE PREFERRED EMBODIMENTS

Figure 1:
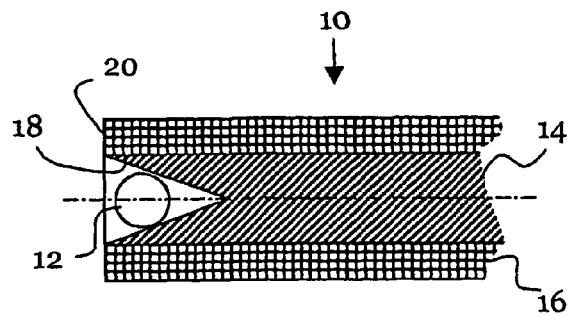
FIG. 1 is a longitudinal section of a first embodiment of a sensor with a conical cutout in the light guiding fiber.

The preferred embodiments of the present invention will now be described with reference to FIGS. 1-19 of the drawings. Identical elements in the figures are designated with the same reference numerals.

FIG. 1 shows in a longitudinal section the end of a light waveguide 10 coupled with a spherical optical resonator 12. The resonator 12 coupled to the light waveguide represents a sensor, capable of measuring physical quantities such as temperature or pressure and/or chemical quantities such as substance concentrations. Here, the light guide serves to connect the sensor with the excitation and evaluation unit, as explained in the context of FIG. 12.

The light guide 10 is a commercially available light guiding fiber, e.g. a multimode fiber with a light guiding core 14 and a transparent cladding 16. The light guide 10 has a circular cross-section. In addition, the light guide can have an external coating (not shown) as mechanical protection. The light guide 10 can have an arbitrary diameter. In the example shown, the diameter of the core 14 is about 100 µm.

In the example shown, the optical resonator 12 is a spherical microparticle made from transparent, homogeneous material. However, the optical resonators can also consist of a core and one or several layers with different indices of refraction. The core can be hollow, evacuated, filled with a liquid or a gas. In the example shown, the diameter is 60 µm.

The resonator 12 is placed in a conical cutout in the light guiding core 14 of the light guide 10. The conical cutout 18 forms a circular opening on the front side 20 of the free end of the light guide 10. The resonator 12 is totally located within the cutout 18 and rests on the conical surface areas. Thus essentially a ring shaped contact zone of the core 14 with the light guide 10 is formed. Due to the clamping effect of the conical shape and the adhesive forces, acting between the microparticle and the surrounding core 14 of the light guide 10 the resonator 12 is mechanically fixed in the cutout 18. The adhesive forces can play an important role at such small bodies. An additional fixation e.g. by an adhesive is unnecessary.

The cutout 18 can be formed e.g. by ion bombardment, or by meltdown, or by laser ablation. In addition, the cutout may be generated by thermoplastic forming, chemical removal (etching) as well as mechanical removal. The cutout can also be formed directly during the manufacturing process of the glass fiber.

In the example shown, the aperture angle of the cone is approximately 40°. As smaller this angle is chosen as higher the clamping effect is. Higher clamping effects are achieved at smaller angles. Preferred are aperture angles smaller than 30°, especially preferred are angles of 15° and smaller. However, it has to be noticed that in the range of such small bodies adhesive forces play a role too.

The diameter of the ring-shaped region—where the resonator 12 is in contact with the light guide 10—depends also on the angle. Preferentially, this diameter (that means the distance of two opposing contact spots) should be larger than the half of the diameter of the resonator 12.

The resonator can than be pressed in the opening from the front side until sufficient fixation is achieved.

The resonator 12 is also optically coupled with the light guide 10 by resting against the core material 14. Light transmitted through the light guide 10 is coupled to the resonator 12 in the contact regions. Here, the geometry determines the degree of coupling; mode matching has to be accounted for. Due to the optical properties of the resonator 12 (index of refraction) multiple total reflections on the surface takes place and by this way a superposition pattern is formed. Phase matched superimposition of the wave trains results in an enhancement of the amplitude of the electromagnetic field. This is called an optical resonance. That effect can be exploited for temperature measurements as described in DE 199 60 370. This document is completely included here with respect to statements of manufacturing, shape and size as well as with respect to the measuring principle used. Equally, it is possible to measure other physical and/or chemical quantities at the location of the resonator.

Figure 12:
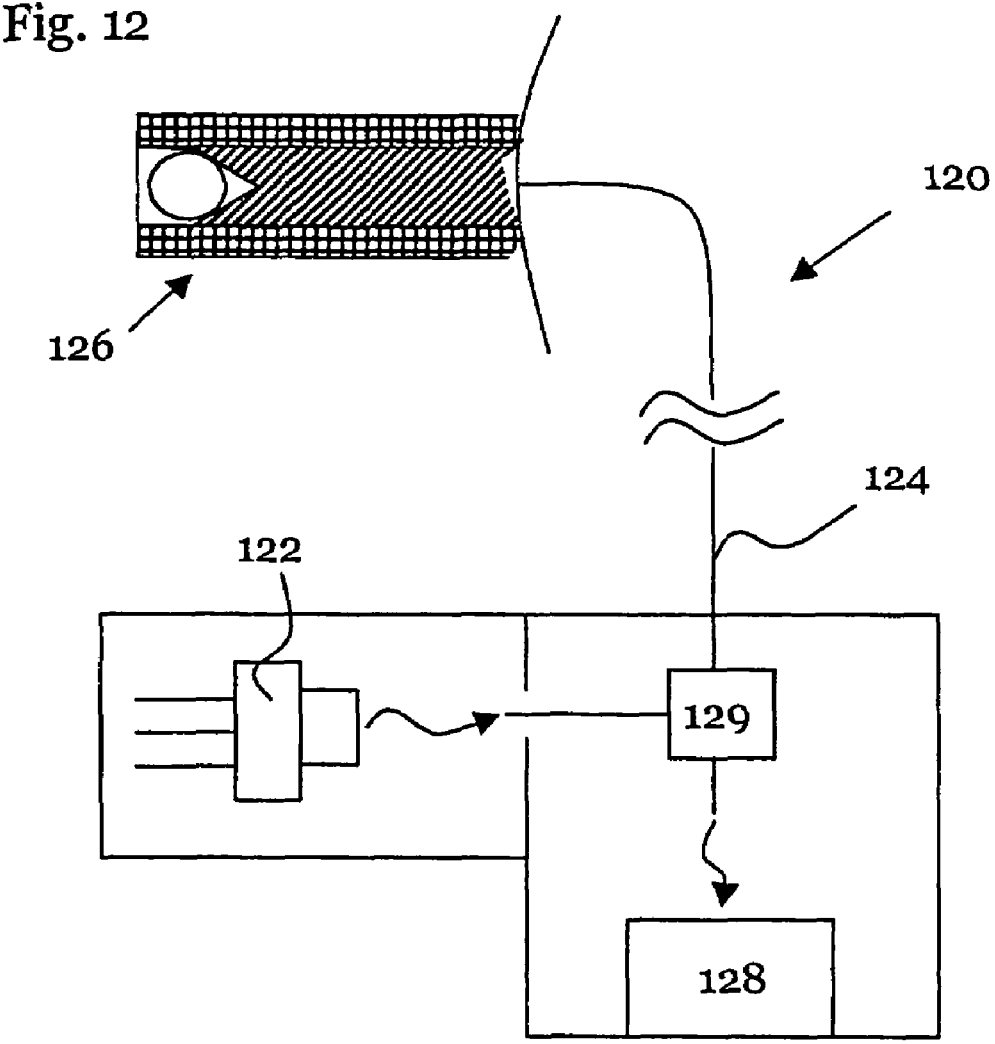
FIG. 12 is a longitudinal section of a schematical illustration of components of a measuring apparatus having a sensor according to FIG. 1.

An adequate measuring apparatus is symbolically represented in FIG. 12. A light source 122—a tunable laser diode in the example shown—provides laser light at a certain, adjustable wavelength. This light is coupled into the the light guide 124 via a directional coupler 129 and propagates in this waveguide in a first propagation direction to its tip 126.

The tip 126 represented in FIG. 12 comprises a resonator and corresponds to the first embodiment of the sensor (FIG. 1). The light is coupled to the resonator. The light guide 10 serves simultaneously for decoupling of light from the optical resonator. Said light is than guided in the opposite direction to the evaluation unit 128. Here, the directional coupler 129 guarantees that only light guided backward through the light guide 124 reaches the evaluation unit 128.

The measuring process can now be carried out as described in DE 199 60 370 by coupling light of a certain spectral range emitted by the laser diode to the light guide. The spectral range should correspond to at least one mode spacing of the resonator. The light decoupled from the resonator is than evaluated with a frequency selective evaluation device such as an optical spectrometer.

Alternatively, it is also possible to use a tunable laser diode 122. The measurement is than carried out by changing the frequency of the tunable laser and by synchronously measuring the amplitude of the light transmitted by the fiber back to the detector unit 128. Preferably, a solid-state light detector (photodiode etc.) is used. In case of resonance, the amplitude of the light transmitted back by the fiber to the detector unit strongly rises. As the frequency of the laser is known, at which that resonance is measured, the determination of the temperature is possible. The attribution of the resonance frequency to the corresponding temperature follows from analytical considerations or, preferentially, by previous calibration. In the same way, pressure, concentration or additional physical and/or chemical quantities can be measured, that change the resonances of the resonator.

In the following, with the aid of FIGS. 2 to 11 various alternative embodiments of a light guide with one or several optical resonators coupled to it are described. These embodiments are for use in a measuring apparatus according to FIG. 12. Here, the optical resonator is always represented as a spherical resonator. Alternatively, the resonator 12 can adopt different shapes—e.g. ellipsoidal shapes—capable to sustain optical resonances. All embodiments displayed in FIGS. 1 to 11 use only one light guide for coupling as well as decoupling of light in and out from the resonator, respectively.

Figure 2:
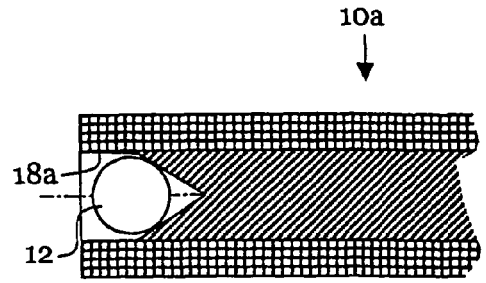
FIG. 2 is a longitudinal section of second embodiments of a sensor with a cylindrical and conical cutout in the light guide.

In the second embodiment according to FIG. 2, the same multimode fiber 10 is used as in FIG. 1. The resonator 12 shows a slightly larger diameter of about 90 μm. The light guide 10a exhibits a cutout 18a with a cylindrical part in the front area and a conical part in the rear area.

The first and second embodiments are identical with respect that advantageous coupling of the light guide and the resonator via the ring-shaped area takes place. Resonators of different sizes can by placed in conical cutout 18 and in the rear conical cutout 18a, respectively. The resonators are always in contact with the conical surface area of the cutout. If the cutout is completely cylindrical (not shown) or partly cylindrical (as in FIG. 2), a predetermined gap between the resonator and the light guiding core 14 can be guaranteed if a resonators of appropriate size is used.

In FIGS. 3 through 9 sensors are shown each with one resonator 12 coupled to optical hollow waveguides. The hollow waveguides show circular cross-sections. The light transmission occurs within a tubular light guide. Transparent cladding is placed around the hollow waveguide. If necessary, the cladding is covered by a mechanical protection coating not shown here. Optical hollow waveguides are commercially available with inner diameter ranging from 50 to 250 μm.

Figure 3:
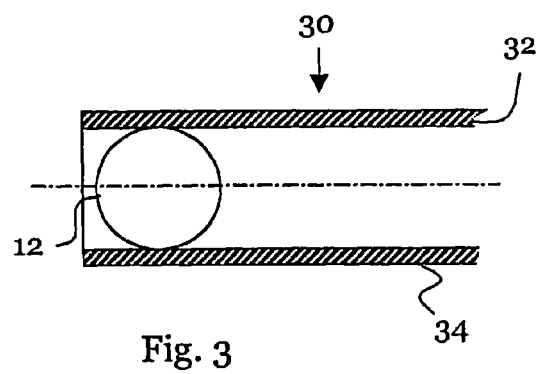
FIG. 3 is a longitudinal section of a third embodiment of a sensor with a microresonator in a hollow waveguide.

In FIG. 3 a third embodiment of a sensor 30 is shown, where the spherical resonator 12 is inserted in the interior of a hollow waveguide 34. The resonator 34 is fixed by clamping within the light guide 34 and is in contact with the light guiding material 32 by a ring-shaped surface line. Especially, if the resonator is fixed by clamping in a hollow waveguide the use of an elliptical resonator (not shown) is advantageous. In this case, the expansion in longitudinal direction may be larger than in the transverse direction. A change in size of the resonator affects for example primarily the longitudinal direction. The contact line and the clamping between the hollow waveguide and the resonator remain nearly unchanged.

The sensor 30 can be manufactured by insertion of the resonator through the front opening. The resonator is adjusted to the inner diameter of the light guide 34. The resonator 12 is completely contained in the interior. Optical coupling and decoupling takes place along the full contact line. In the embodiment shown in FIG. 3 the inner diameter corresponds basically to the diameter of the resonator 12 and an exact tangential coupling takes place.

For an advantageous coupling between hollow waveguide and resonator—useful for an application as sensor—the mode volume of the light guiding layer and that of the resonator should match each other as far as possible. Good matching for resonators with diameter from 50 μm to several 100 μm resulted if the light guiding layer had thicknesses of 1-10 μm.

In addition, it turned out coupling is achieved, that is especially useful for measurements, if a small spacing remains between the light guiding part of the hollow waveguide and the resonator. Such spacing can be fabricated by a thin spacing layer. Such a spacing layer has to be transparent and must have an index of refraction that is lower than that of the light guiding material and the material of the resonator. The layer can be placed on the surface of the resonator, on the inner side of the hollow waveguide or on both. An adequate value for the thickness of the spacing layer depends on the index of refraction of the resonator, of the light guide, and of the material of the spacing layer. For example, thicknesses of the layer of 1 μm or less turned out as adequate.

Figure 3A:
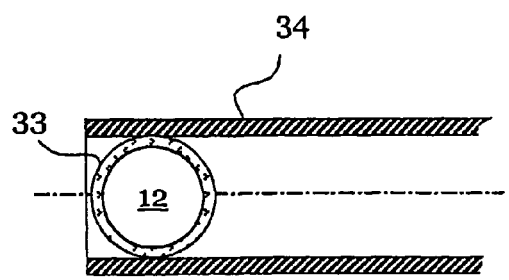
FIG. 3a is a first version of the third embodiment with a spacing layer on the resonator.
Figure 3B:
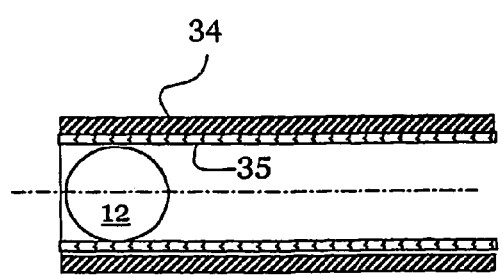
FIG. 3b is a second version of the third embodiment with a spacing layer on the hollow waveguide.

FIG. 3a shows a variant of the third embodiment, where an appropriate spacing layer 33 is placed on the outside of the resonator 12 (for improved clearness the presentation is not to scale). Correspondingly, in FIG. 3b shows a second variant with a spacing layer 35 on the inside of the hollow waveguide 34.

Figure 4:
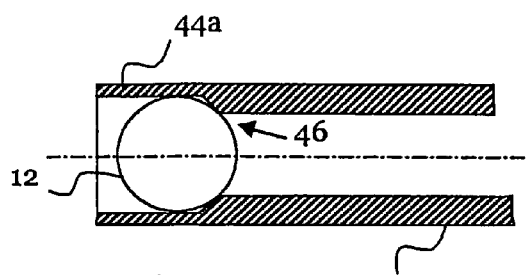
FIG. 4 is a longitudinal section of a forth embodiment of a sensor with a microresonator in a hollow waveguide having a stepped inner diameter.

FIG. 4 shows a fourth embodiment that concerns the coupling of a resonator 12 with a hollow waveguide 44 as shown in FIG. 3. The hollow waveguide 44 shows a step like onset 56 in this case. The onset 46 can be designed as real step (not shown) or as part of a conical surface, as shown in FIG. 4. Due to the step like onset the axial position of the resonator 12 is defined, simultaneously an automatic centering is achieved. The coupling can take place through the onset 46 or through the thin cylindrical part 44a of the hollow waveguide 44. Thus, high flexibility is achieved for matching the modes of the hollow waveguide to the modes of the resonator.

Figure 4A:
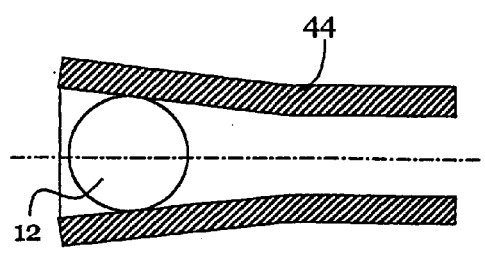
FIG. 4a is a version of the forth embodiment with an enlarged hollow waveguide.

FIG. 4a shows a variant of the fourth embodiment, where the free end of the hollow waveguide 44 is expanded. This embodiment was shown to be especially advantageous with respect to a simple matching of the size of the hollow waveguide 44 and the resonator 12. In addition, the light-guiding layer can become thinner to the and, as shown in FIG. 7b.

Figure 5:
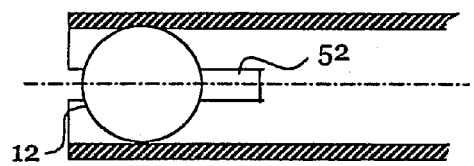
FIG. 5 is a longitudinal section of a fifth embodiment of a sensor with a hollow waveguide having a slit.
Figure 6:
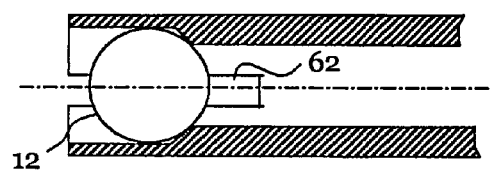
FIG. 6 is a longitudinal section of a sixth embodiment of a sensor with a hollow waveguide having a stepped inner diameter and a slit.

The fifth and sixth embodiment according to FIG. 5 and FIG. 6 respectively corresponds to the third and fourth embodiment with the difference that provision is made for a lengthwise slit 52, 62 on the end of the corresponding hollow waveguide. In that way, the elasticity of the hollow waveguide is increased on the tip. This allows an adjustment of the diameter of the hollow waveguide to the external diameter of the resonator during the impression. The elastic forces generated thereby provide the fixation of the resonator 12 in the tip region.

Figure 7A:
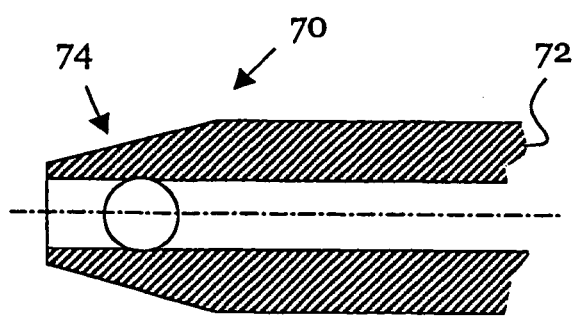
FIG. 7a is a longitudinal section of a seventh embodiment of a sensor with a light-guide tapered on its end.
Figure 7B:
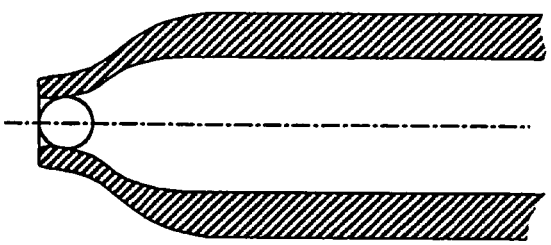
FIG. 7b is a longitudinal section of a version of the seventh embodiment of a sensor with a tapered end of the light guiding device.

In FIG. 7a a sensor 70 is shown, where the light guiding cladding 72 of the hollow waveguide is tapered in the region 74. That tapering assures a better spatial superposition of the resonator modes with the hollow waveguide modes. A variant of that embodiment is shown in FIG. 7b. Here, the light guiding layer becomes thinner to the end. In the embodiment shown, the inner diameter as well as external diameter of the hollow waveguide are smaller at the end.

There has thus been shown and described a novel measuring apparatus which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Figure 8:
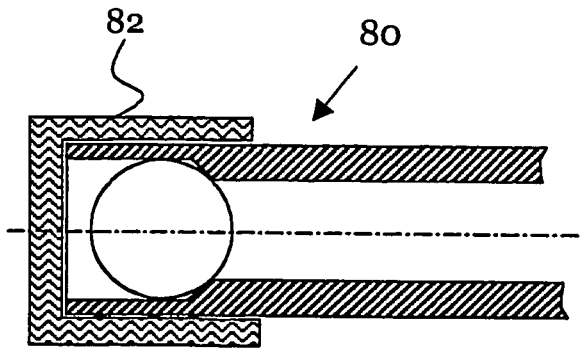
FIG. 8 is a longitudinal section of an eighth embodiment of a sensor having a cap as cover.
Figure 9:
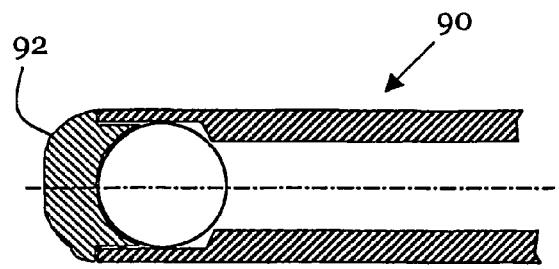
FIG. 9 is a longitudinal section of a ninth embodiment of a sensor having as sealing compound as cover.

In FIGS. 8 and 9 an eighth and ninth embodiment 80, 90 of sensors are illustrated. These Figures show hollow waveguides with resonator bodies coupled to it. In the eighth embodiment, a cap 82 is slipped on the hollow waveguides for insulation purpose, and is fixed there in an appropriate way. In the ninth embodiment, the hollow waveguide with the inserted microresonator is sealed by a sealing compound 92. That sealing can be achieved by a hardening adhesive, a plastic, or other materials. The sealing can be made in a way that the sealing compound 92 has no contact to the resonator. Preferentially, the material of the sealing (sealing cap 82, and sealing compound 92, respectively) can be chosen to be light absorbing to suppress reflections from the end of the light guide.

Naturally, the particular characteristics of the various embodiments afore mentioned (lengthwise drilling or hollow waveguide, cylindrical or conical shape, slit, step, tapering, cap, sealing) can be arbitrarily combined for a specific application. Insofar, the sensors shown in FIGS. 1 to 9 are only exemplary combinations of these characteristics.

Figure 10:
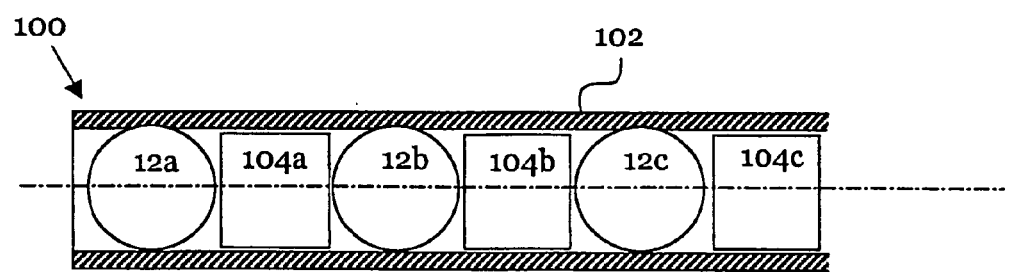
FIG. 10 is a longitudinal section of a tenth embodiment of a sensor with several microresonator in a hollow waveguide.
Figure 11:
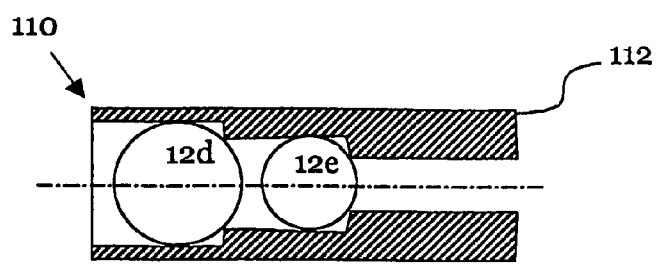
FIG. 11 is a longitudinal section of eleventh embodiment of a sensor with several microresonators having different diameters.

The FIGS. 10 and 11 show a tenth and eleventh embodiment 100, 110 of sensors. In the case of sensors 110 several resonators 12a, 12b, 12c, 12d, 12e are proposed. Several of these resonators are coupled to the same light guide.

In the tenth embodiment—analogous to the resonator housing in the third embodiment in a hollow waveguide 102—provision is made for several resonators 12a, 12b, 12c arranged with a certain distance. Three of them are displayed here. They are kept at a certain distance by spacers 104a, 104b, 104c. Alternatively, they can also be fixed by friction and/or adhesive forces on the corresponding location. The resonators 12a, 12b, 12c are commonly coupled to one light guide 102 as in the third embodiment.

In the example displayed, the resonators 12a, 12b, 12c are made to resonate at different frequencies of the light coupled to the resonators. This can be achieved by using materials with different indices of refraction, or by ellipsoidal resonators (not shown). In these ellipsoidal resonators, one axis corresponds to the inner diameter of the light guide 102; the other axis—oriented lengthwise—has a different size so that the desired different resonance frequencies result.

In FIG. 11 the sensor 110 that corresponds to the eleventh embodiment is shown. In this embodiment, resonators of different sizes 12d, 12e are coupled to the same hollow waveguide 112 that has several steps in the example shown. The resonators 12d, 12e exhibit different resonance frequencies. They can be made from the same material.

The use of several resonators in the tenth and eleventh embodiment can have different advantages. On the one hand, after a single positioning of the sensor 100 the temperature can be measured at different locations, namely at the locations of the corresponding resonators 12a, 12b, 12c. On the other hand, with a sensor having different resonators the range of the temperature measurement can be extended and/or the accuracy of the measurement can be improved. That can concern e.g. the resonator material. The thermal expansion coefficients of polymers and glass e.g. differ by an order of magnitude. Using resonators of both materials simultaneously, a large measuring range can be achieved by the glass-resonator e.g.; but within a certain range of it high accuracy can be achieved by an appropriate polymer-resonator.

It is explicitly emphasized that the different features of the various embodiments described previously (cut-outs, or hollow waveguide, spacing layer, step-like or enlarged shape, slit, cover, several hollow waveguides) are here only presented in exemplary combinations. These features can also be combined differently, in the framework of this invention.

Figure 13:
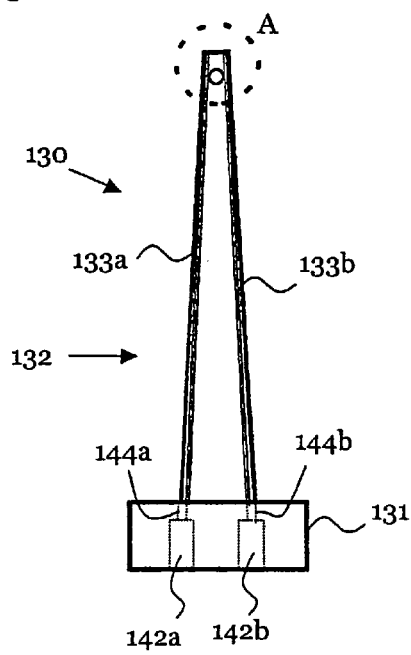
FIG. 13 is a longitudinal section of a twelfth embodiment of a sensor with a sensor shaped as sensing tip.

In FIG. 13 a twelfth embodiment 130 of a sensor is shown. It concerns a device to couple optical microresonator 12 to two commercially available light guides.

Figure 19:
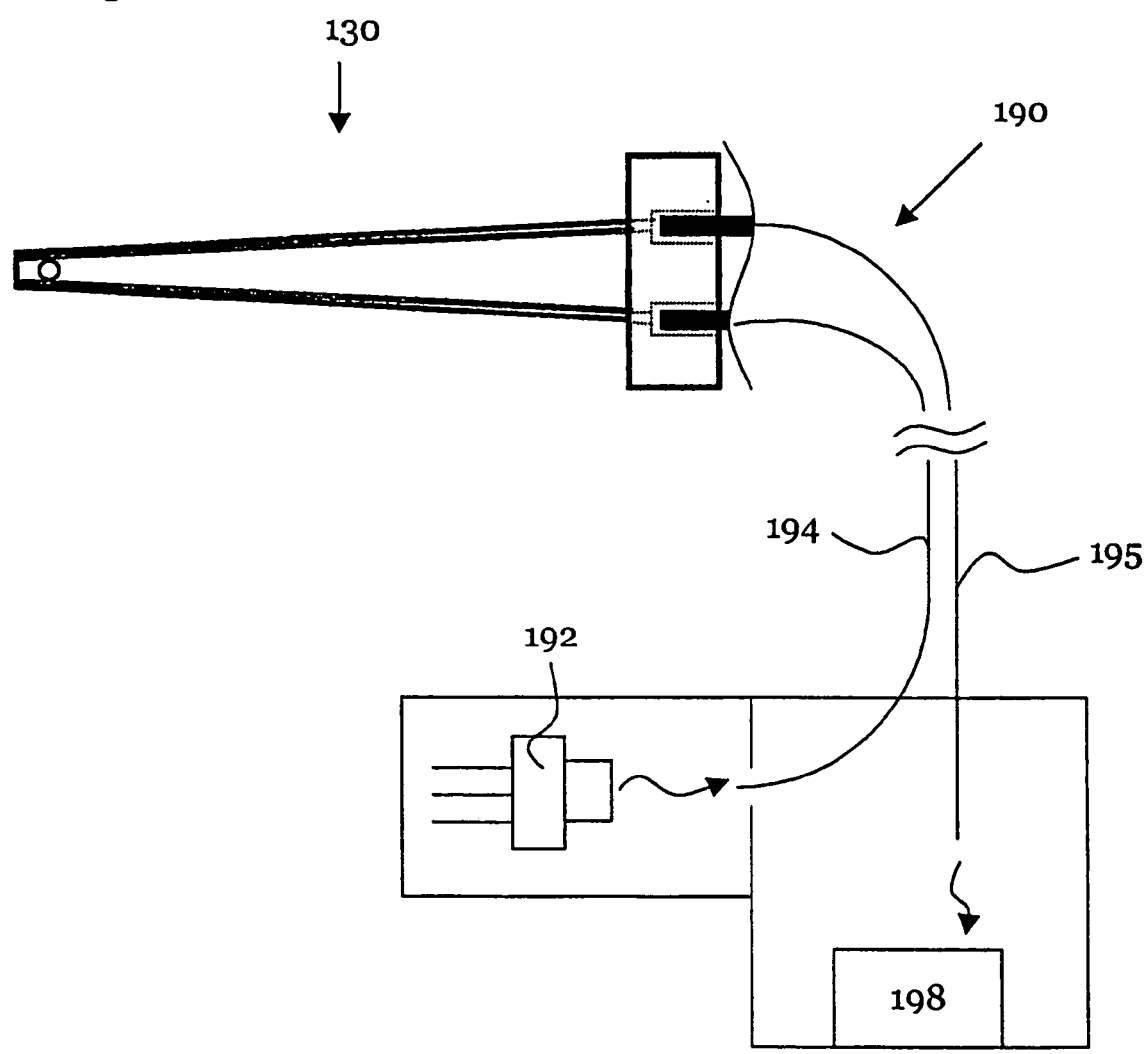
FIG. 19 is a schematical representation of components of a second embodiment of a measuring apparatus having a sensor according to FIG. 13.

The total measuring setup is shown in FIG. 19. Also in this case—as described in DE 199 60 370—a physical or chemical quantity, e.g. the temperature, is measured at the location of the resonator. This is done by guiding light of a laser diode 192 via a first light guide 194 to the sensor 130 and by coupling there the light to the microresonator. The light decoupled from the microresonator is guided back by a second fiber 195 to the measuring device and transferred to an evaluation unit 198. The evaluation is carried out as explained previously with respect to FIG. 12. The measuring device 190 differs from the measuring device 120 of FIG. 12 by the fact that two light guides are used for the coupling of the sensor 130 to the measuring device.

Figure 13A:
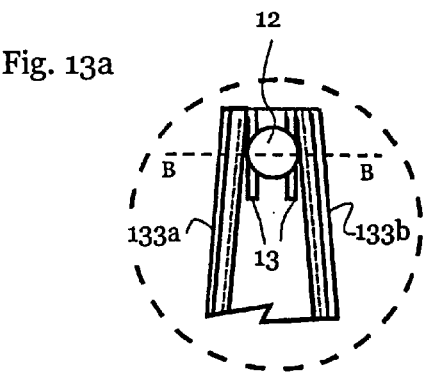
FIG. 13a is a magnified view of the region A of FIG. 13.

The sensor 130 displayed in FIG. 13 comprises a socket 131 and a wedge-shaped sensing tip 132. The sensing tip 132 is formed by two bars 133a, 133b that converge to the tip. In the enlarged domain of the end of a sensing tip 132 depicted in FIG. 13a, the optical resonator 12 is placed between the bars 133a, 133b. The resonator rests against both bars and is fixed in this place by clamping and adhesive forces.

Figure 13B:
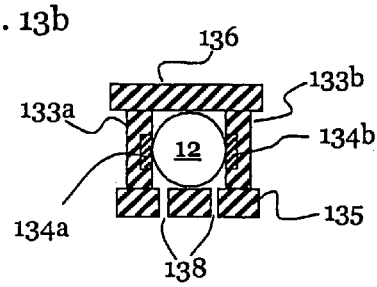

As visible in the cross-section displayed in FIG. 13b the bars 133a, 133b have strips 134a, 134b made from light guiding material. The strips 134a, 134b run centric along the inner side over the total length of the bars 133a, 133b. They rest tangentially against the resonator 12, as shown in FIG. 13b.

Additionally, as shown in FIG. 13b, the sensing tip 132 comprises a base plate 135 and a cover plate 136 that close the region between the bars 133a, 133b to the top and bottom. The base plate 135a has two slits 136 in the end region of the tip. Thus, the elasticity of the sidebars is increased; they can spring apart to accept the microresonator in-between. By the elastic forces, good fixation of the resonator 12 is achieved.

The wedge shaped embodiment of the sensor 130 allows the transition from this size of the optical resonators—their size is typically less than 100 μm—to the distance of two commercially available light guides resting side by side. The core distance of the light guides is in the order of 0.5 mm. The wedge angle is chosen so that the resonator 12 can be pushed between the sidebars 133a, 133b and is fixed there by friction and adhesive forces. Due to the wedge shaped embodiment it is possible to use resonators of different sizes. Where required, several resonators with different diameters can be placed between the bars 133a, 133b at different locations.

The sensing tip 132 can be manufactured e.g. by methods used for the production of integrated circuits.

Figure 14:
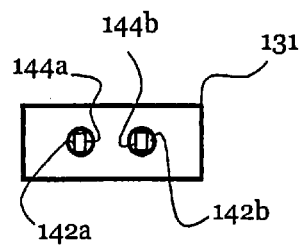
FIG. 14 is a view of the front side of a first embodiment of the socket of the sensor according to FIG. 13.

The socket 131 serves for connecting the light guides. Here, different embodiments are possible. FIG. 14 shows the socket 133 in a front view with two openings 142a, 142b to plug in conventional light guide fibers. The holes 142a, 142b are drilled in the rectangular socket 131. The light guiding strips 134a, 134b are fed through the channels 144a, 144b to the plug-in holes 142a, 142b in a way that the light guiding fibers inserted in the holes 142a, 142b are optically coupled to light guiding strips.

Figure 15:
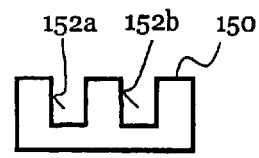
FIG. 15 is a view of the front side of a second embodiment of the socket of the sensor according to FIG. 13.

FIG. 15 shows an alternative embodiment of a socket 150 that can be used in place of the socket 131. The socket 150 is designed as slit socket. The light guiding fibers are pressed in the slits 152a, 152b and appropriately fixed there, molded e.g., or glued.

Figure 16:
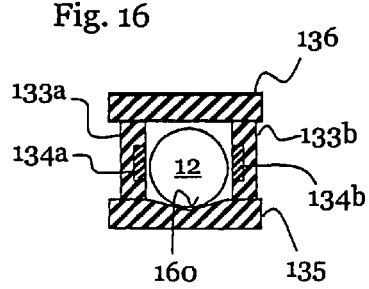
FIG. 16 is a cross-section through the tip of a thirteenth embodiment of a sensor.
Figure 17:
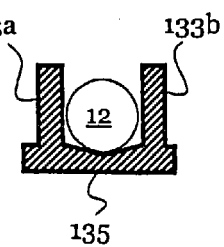
FIG. 17 is a cross-section through the tip of a fourteenth embodiment of a sensor.
Figure 18:
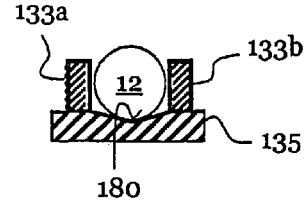
FIG. 18 is a cross-section through the tip of a fifteenth embodiment of a sensor.

In the FIGS. 16 through 18, the thirteenth, fourteenth, and fifteenth embodiments of a sensor are represented. In each case, cross-sections of the resonator area 12 are shown. Regarding their constructions, the particular sensors correspond to the wedge-shaped sensing tip 130 with socket 131 from FIG. 13.

The thirteenth embodiment (FIG. 16) corresponds to the sensor shown in FIG. 13b with bars 133a, 133b, cover plate 136, and base plate 135. However, in this case the resonator does not rest directly against the bars 133a, 133b, but a guide groove 116 is shaped in the base plate 135 to center the microresonator placed in the guide groove 160. Between the light guides 143a, 143b in the bars 133a, 133b and the resonator 12 a small gap exists. Wit this gap the coupling degree between the light guiding strips 134a, 134b and the resonator 12 can be affect.

In the fourteenth embodiment (FIG. 17) the bars 133a, 133b, as well as the base plate 135 consist completely of light transmitting material greatly facilitating the manufacturing. Also in this case, in the area of the socket the bars are connected to individual light guides to couple or decouple light. Due to the completely light transmitting base plate 135, a small cross talk results between light guides to and from the resonator. Due to the geometrical situation, this effect is limited.

Also in this case the base plate 135 has a central depression to center the resonator 12 that can be omitted, if necessary.

Alternatively, to the embodiment shown in FIG. 13b with strips 134a, 134b made from light guiding material, the bars 133a, 133b can also consist completely of light guiding material, as shown in the fifteenth embodiment (FIG. 18). That can be combined e.g. with the clamping of the resonator 12 between the bars, where slits 138 in the base and cover plate are advantageous. Alternatively, as shown in FIG. 18a centering of the resonator 12 between the bars 133a, 133b in a guide groove 180 is possible. In this case it is possible to provide a certain distance between the bars 133a, 133b—consisting completely of light transmitting material—and the microresonator 12.

The invention claimed is:

1. An apparatus for the measurement of physical and/or chemical quantities using a light source and a light guide to couple the light of the light source into an optical resonator shaped as microparticle, and means for the observation of the light decoupled from the resonator, the improvement wherein the light guide is a hollow waveguide and the resonator is at least partly mounted within the hollow waveguide and fixed there mechanically and coupled optically to the light guide, wherein only one light guide is present, and wherein the light propagates in a first propagation direction from the light source to the resonator (resonators) and back from the resonator in a second, opposite propagation direction.

2. Apparatus according to claim 1, wherein the hollow waveguide has at least at a first position a larger inner diameter than at a second position, the first position being close to a free end and the second position being farther from the free end.

3. Apparatus according to claim 1, wherein only one light guide is present, and wherein the light guide light propagates in a first propagation direction from the light source to the resonator and back from the resonator in a second, opposite propagation direction.

4. Apparatus according to claim 1, wherein more than half of said resonator is received in said space.

5. Apparatus according to claim 1, wherein said resonator has a smaller diameter than the core diameter of the hollow light guide.

* * * * *